Figure 1:
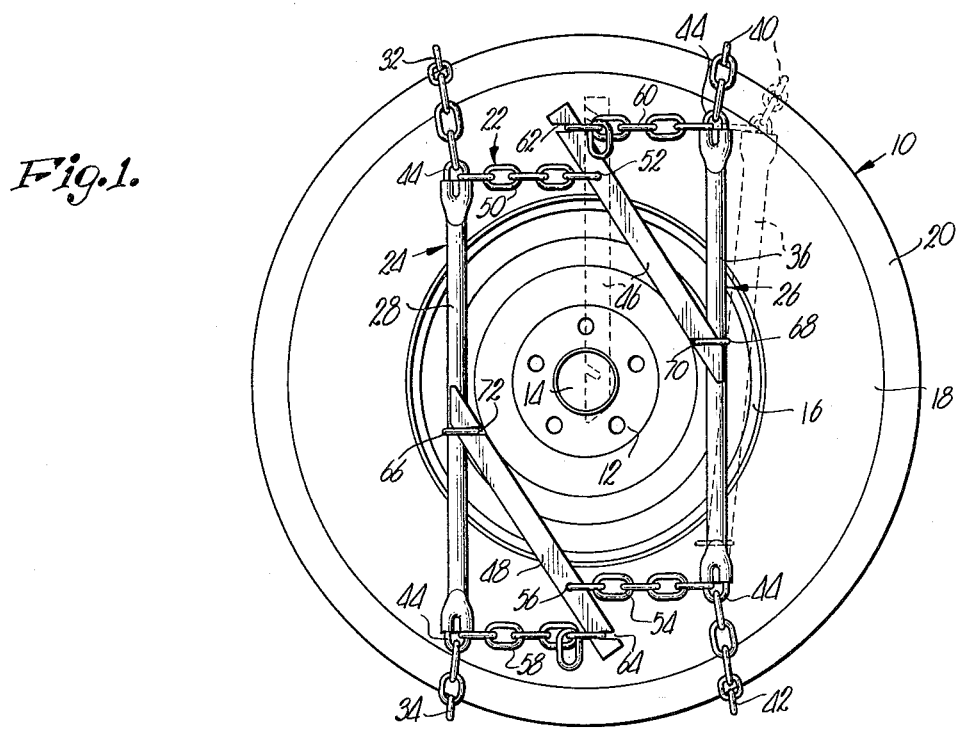

May 7, 1963 T. A. MYERS 3,088,511
TIRE CHAIN ASSEMBLY
Filed Sept. 25, 1961

INVENTOR.
Truman A. Myers
BY
Hovey, Schmidt, Johnson & Hovey,
ATTORNEYS.

United States Patent Office 3,088,511
Patented May 7, 1963

3,088,511
TIRE CHAIN ASSEMBLY
Truman A. Myers, R.F.D. 1, Hoyt, Kans.
Filed Sept. 25, 1961, Ser. No. 140,317
8 Claims. (Cl. 152—217)

This invention relates to a tire chain assembly for vehicles, and particularly to an improved traction unit which may be placed on the tire without the necessity of moving the vehicle, raising the wheel off of the ground or reaching behind the wheel in order to securely fasten the chain over the peripheral surface of the tire.

Many types of tire traction devices have previously been provided to afford better traction for vehicles under adverse weather conditions where the road surfaces are covered with ice or snow. Although many complicated and expensive traction devices have been suggested and tried at various times, most of the same have not been commercially successful because of the great expense of the units, failure of the devices to satisfactorily provide traction for the vehicle wheels, and the difficulties encountered by individuals while they attempt to place the traction units on the rear wheels of the vehicle. For this reason, the tire chains which have been in existence for a long time, still remain the most satisfactory method of providing better traction for vehicle wheels in ice or snow.

These conventional tire chains are of ladder construction with a pair of elongated side chains having a number of transverse, flexible links therebetween. In order to quickly place ladder tire chains on the vehicle wheels, the most expeditious manner of securing the chains to the tires involves raising the wheels of the vehicle off of the ground and then draping the chain over the top of the tire to permit interconnection of the opposed ends of the side chains at the bottom side of the tire. Lifting the wheels of the car off of the ground is oftentimes impossible or rendered difficult at the very least, under the inclement weather conditions where the tire chains are required. Many persons have given up efforts to place the chains on the tires themselves and employ service stations or the like to perform the mounting operation. Obviously, this is an expensive procedure and undesirable in many respects because weather conditions may deteriorate rapidly when an individual is at a considerable distance from a service facility.

Attempts to place the ladder-type tire chains on the wheels without raising the same requires that the chain be either laid on the ground and the vehicle driven onto the same, or the chain placed over the tire and the vehicle driven a distance to permit interlinking of opposed ends of the side chains of the traction device. Not only is it impossible under these conditions to secure the chain tightly to the tire, but it is also necessary that the person mounting the chains reach behind the vehicle wheel to interconnect the inner side chains of the traction unit. This is an extremely dirty operation and many times impossible during conditions of heavy traffic or at nighttime when it is impossible to adequately work in the dark to mount the tire chains.

It is, therefore, the primary object of the present invention to provide a tire chain assembly capable of providing traction equal to that of ladder-type chains described above, but which may be mounted by an individual without the necessity of raising the wheels off of the ground, moving the vehicle during the mounting procedure, or necessitating that the individual reach behind the tire to mount the device thereon.

An especially important object of the invention is to provide a tire chain assembly meeting the requirements defined and provided with a pair of generally rectangular units which may be draped over the tire without raising the same off of the ground, and are then interconnected with novel structure so as to frictionally retain the rectangular units over the tires in frictional engagement therewith to provide traction for the tire under icy conditions.

Also an important object of the invention is to provide a tire chain device wherein the rectangular units which are draped over the tire on opposite sides of the axis of rotation of the wheel, are interconnected by novel lever structure, permitting the rectangular units to be tightly secured to the wheel without the necessity of the individual mounting the units, employing excessive effort to frictionally secure the rectangular traction units to the tire.

An especially important object of the invention is the provision of a novel tire chain assembly which may be mounted from the outside of the tire without raising the vehicle wheel off of the ground wherein the rectangular components on opposed sides of the axis of rotation of the tire each include a pair of elongated, relatively rigid members adapted to be disposed on the inner and outer faces of the tire respectively and interconnected at opposed ends thereof by conventional flexible chain links which normally extend across the outer peripheral surface of the tire to provide traction therefor during movement of the vehicle.

Another significant object of the invention is the provision of a tire chain assembly as described which is of such nature that the same may be mounted on vehicle tires of various sizes without modification of the device being required.

A still further important aim of the invention is to provide a tire traction device of the type defined which is adapted to be made of relatively lightweight materials so that the individual mounting the unit may place the same on the vehicle wheel with a minimum of effort, but with the tire chain assembly being constructed in a manner to cause the same to be of high strength characteristics, notwithstanding the lightweight properties of the same.

A further object of the present invention is the provision of a tire chain assembly adapted to be fitted over the wheel of a vehicle, and wherein is included a pair of traction-producing units having chains thereon engageable with the tire of the wheel, whereby, when the units are drawn together, the chains thereof tightly engage the periphery of the tire and remain in fixed positions thereon as the wheel rotates.

Yet another object of the present invention is the provision of a pair of elongated members forming a part of each of the aforesaid units and wherein one of the members is drawn toward the corresponding member of the other unit by lever means thereon, whereby the units are drawn together to urge the chains against the periphery of the tire and thereby hold the chains in fixed positions so long as the units are urged toward each other.

Still another object of the present invention is the provision of lever means on the units for drawing the latter together and thereby drawing the chains against the periphery, and wherein the lever means is disposed on the normally outermost side of the wheel, whereby the lever means does not interfere with the axle of the vehicle interconnecting the wheel to the latter, and thus permits rotation of the wheel unimpeded by the presence of the tire chain assembly.

Figure 2:
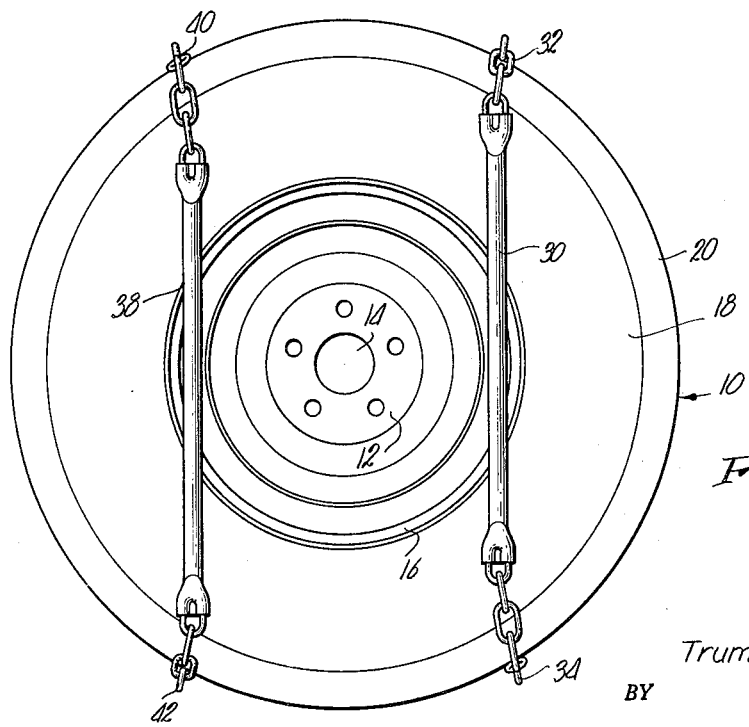

Other objects of the present invention will become apparent as the following specification progresses, reference being had to the accompanying drawing, wherein:

FIGURE 1 is an elevational view of one side of a wheel with the tire chain assembly which forms the subject of the present invention operably coupled therewith; and FIG. 2 is an elevational view of the opposite side of the wheel and illustrating the tire chain assembly thereon.

The present invention provides a tire chain assembly for a wheel formed from a pair of units which are adapted to be disposed on opposed sides of the axis of revolution of the wheel. Each unit is comprised of a pair of elongated members formed from rigid material and adapted to be disposed on opposed sides of the wheel. A pair of chains interconnect corresponding ends of the members and are adapted to engage the periphery of the tire carried by the wheel.

Lever means is provided on the units for drawing the units together and thereby drawing the chains tightly over the periphery of the tire. The lever means includes a pair of levers on the members disposed on one side of the wheel, each lever being engageable with the member adjacent thereto for drawing the later toward the member corresponding thereto. Ring means is included on the members for engaging in looped relationship the proximal ends of the levers to maintain the latter in fixed positions when the units have been drawn together.

In FIG. 1, a wheel 10 is comprised of a hub 12, having an opening 14 therein for receiving the axle of a vehicle to which wheel 10 is to be coupled. A rim 16 is integral with hub 12 and mounts thereon a tire 18 having an outermost periphery 20 which is adapted to engage the surface of a roadway over which the vehicle, coupled with wheel 10, moves.

Tire chain assembly 22 is adapted to be positioned over wheel 10 to increase the traction thereof over the surface when snow, ice, sleet or the like cover the surface to thereby reduce the force of friction between periphery 20 of tire 18 and the surface.

Assembly 22 includes a pair of units 24 and 26 disposed on opposed sides of the axis of rotation of wheel 10. Unit 24 is comprised of a pair of elongated members 28 and 30 interconnected at corresponding ends thereof by chains 32 and 34. Similarly, unit 26 is comprised of a pair of elongated members 36 and 38 interconnected at corresponding ends thereof by chains 40 and 42. Members 28, 30 36 and 38 are preferably formed from tubular stock of high strength characteristics and to this end, each end of the aforesaid members is flattened and provided with a link 44 protruding therefrom and held therein by pressing together opposed zones of each of the members in the vicinity of the end thereof. Thus, links 44 are anchored in the corresponding ends of members 28, 30, 36 and 38 so that the same may be linked with the corresponding chains 32, 34, 40 and 42.

Units 24 and 26 are adapted to be disposed on wheel 10 with members 28 and 36 on one side of wheel 10 and members 30 and 38 on the opposite side of wheel 10. In these positions, the ends of members 28 and 30 are disposed adjacent and radially inwardly of circumferentially spaced zones on the periphery 20 of tire 18. Chains 32 and 34 are then positioned across periphery 20 at said zones and remain in fixed positions so long as one of the members is urged toward hub 12. Similarly, the ends of members 36 and 38 are disposed adjacent and radially inwardly of periphery 20 with chains 40 and 42 extending across and engaging periphery 20 at the zones proximal to the ends of members 36 and 38.

Means is provided for drawing members 28 and 36 toward each other when units 24 and 26 are disposed on wheel 10, and include a pair of levers 46 and 48 respectively. A chain 50 is coupled with the link 44 at one end of member 28, and is secured through an aperture 52 in lever 46 intermediate the ends of the latter. Similarly, a chain 54 is secured to the link 44 at the end of member 36 diagonally opposed to the end of member 28 to which chain 50 is attached. Chain 54 is received within an aperture 56 in lever 48 intermediate the ends of the latter. Levers 46 and 48 are, therefore, shiftably mounted on the respective members 28 and 36 for movement relative to the latter.

A chain 58 is secured to the link 44 at the opposite end of member 28, and a chain 60 is secured to the link 44 at the end of member 36 opposite to the end carrying chain 54.

Levers 46 and 48 are provided with notches 62 and 64 respectively adjacent the outermost ends thereof when chains 50 and 54 are parallel and inwardly directed, as shown in FIG. 1. One of the links of chain 60 is received within notch 62 in lever 46, and one of the links of chain 58 is received within notch 64 of lever 48. As the opposite ends of levers 46 and 48 are shifted toward members 36 and 28 respectively, chains 60 and 58 become taut and thereby urge the corresponding ends of members 28 and 36 inwardly. Since levers 46 and 48 are secured to corresponding ends of members 28 and 36 through chains 50 and 54, these ends also move inwardly, together with the ends of members 28 and 36 opposite thereto. It can, therefore, be seen that chains 32, 34, 40 and 42 are thus drawn tightly over periphery 20 and are maintained in fixed positions so long as levers 46 and 48 create tensions in chains 50, 54, 58 and 60.

Rings 66 and 68 are looped over and slidable along the lengths of members 28 and 36 respectively. Rings 68 and 66 are receivable within notches 70 and 72 respectively in the ends of levers 46 and 48 opposite to the ends having notches 62 and 64 therein. The ends of levers 46 and 48 having notches 70 and 72 are bevelled to permit rings 66 and 68 to be looped over the ends of levers 46 and 48 and into the notches 60 and 72 when levers 46 and 48 move from a first position wherein chains 50, 54, 58 and 60 are in relaxed conditions to second positions wherein the last-mentioned chains are in taut conditions.

As illustrated in FIG. 1, lever 46 is shown in dashed lines when the same is in the aforesaid first position. Also, member 36 is shown in dashed lines when member 46 is in the dashed line position adjacent thereto.

In use, units 24 and 26 may be simultaneously placed on wheel 10 with the members 28 and 36 positioned on the normally outermost side of the latter. Members 28 and 36 are thereupon drawn together by placing one of the links of chain 58 in notch 64 of lever 48, and by placing one of the links of chain 60 in notch 62 of lever 46. Levers 46 and 48 are thereby swung toward members 36 and 28 respectively, and rings 66 and 68 are looped over the proximal ends of levers 48 and 46 respectively and received within notches 72 and 70 respectively. In this condition, chains 32, 34, 40 and 42 tightly engage periphery 20 of tire 18 and are maintained in fixed positions since members 30 and 38 are not free to move radially outwardly so long as members 28 and 36 are urged toward each other under the influence of levers 46 and 48. Chains 32, 34, 40 and 42 thereby augment the traction of wheel 10 on the surface over which the same travels so as to prevent sliding and skidding of wheel 10 in the event that the surface is covered with sleet, snow or ice.

Members 30 and 38 are prevented from moving radially outwardly since chains 32, 34, 40 and 42 provide components of force acting in opposite directions along the longitudinal axes of members 30 and 38. Also, members 30 and 38, like members 28 and 36, engage the side wall of tire 18 and there exists between said members and the side wall, a certain amount of friction which gives rise to a frictional force for preventing the outward movement of members 28, 30, 36 and 38.

It is noted that the end of member 28 carrying chain 50, is positioned radially inwardly from the end of member 36 carrying chain 60. Similarly, the end of member 36 carrying chain 54 is positioned radially inwardly relative to the end of member 28 carrying chain 58. Members 28 and 36 are positioned in this manner to accommodate the presence of levers 46 and 48 in view of the fact that the latter are interconnected intermediate the ends thereof to chains 50 and 54 respectively.

The assembly 22 may be utilized with wheels 10 of varying widths. To compensate for the variation with wheel 10, adjustable links may be placed at the ends of chains 32, 34, 40 and 42 so as to maintain the ends of members 28, 30, 36 and 38 spaced from periphery 20 of tire 18. The chains 32, 34, 40 and 42 therefore, engage at the major portion thereof with periphery 20.

Similarly, assembly 22 may be utilized with tires of varying diameters by placing any of the links of chains 58 and 60 adjacent the outermost ends of the latter in slots 62 and 64 respectively. As shown in FIG. 1, the outermost links of chains 58 and 60 are not utilized and, therefore, loosely depend from the links adjacent thereto. For a tire of greater diameter, the outermost links would be received in notches 62 and 64 so that members 28, 30, 36 and 38 remain in substantially the same positions relative to the periphery 20 of the tire 18, of the larger diameter wheel 10.

It is evident that wheel 10 need not be moved in order to place assembly 22 thereon. The operator of assembly 22 may position units 24 and 26 on opposed sides of hub 12 and then interconnect units 24 and 26 by virtue of placing the appropriate links of chains 58 and 60 in notches 62 and 64 of levers 46 and 48. It is, therefore, evident that a considerable saving of time and effort is realized when utilizing assembly 22 in comparison with the time and effort required to place conventional tire chains on the wheels of a vehicle.

Members 28, 30, 36 and 38 are preferably formed from a generally lightweight material such as tubular aluminum having relatively high strength characteristics. Levers 46 and 48 may be formed of any suitable material capable of withstanding extremely large forces thereon at the ends thereof. In view of the materials forming members 28, 30, 36 and 38 and levers 46 and 48, it is clear that assembly 22 is lightweight in character to render the same readily manipulable for placement on wheel 10.

Having thus described the invention, what is claimed as new and desired to be secured by Letters Patent is:

1. A chain assembly for a wheel having a tire thereon and movable over a surface, said assembly comprising a pair of traction-producing units, each including a pair of elongated members and a pair of chains interconnecting corresponding ends of said members, said units adapted to be positioned on said wheel on opposed sides of the axis of revolution thereof with the members of each unit being disposed on opposed sides of said wheel and the chains being disposed across and engageable with the periphery of the tire; a lever for each of the members disposed on one side of the wheel, each lever being shiftably carried by the corresponding member and engageable with the adjacent member for drawing the members disposed on said one side of the wheel together responsive to each movement of the lever from a first position to a second position; and means on each of said last-mentioned members for securing thereto the lever shiftably carried by the adjacent member when said lever is in said second position, whereby said chains may be drawn against and maintained in fixed locations on said periphery to thereby augment the traction of the wheel on said surface.

2. A chain assembly as set forth in claim 1, wherein is included an elongated element secured to one end of each of the last-mentioned members, said element being operably coupled with the lever of the adjacent member and movable toward the latter as said lever is shifted toward said second position.

3. Traction apparatus for a wheel having a tire thereon and movable over a surface, the combination with said wheel of a pair of traction-producing units, each including a pair of elongated members and a pair of chains interconnecting corresponding ends of said members, said units being positioned on said wheel on opposed sides of the axis of revolution thereof with the members of each unit being positioned on opposed sides of the wheel and the chains being positioned across and engageable with the periphery of the tire; a lever for each of the members positioned on one side of said wheel, each lever being shiftably carried by the corresponding member and engageable with the adjacent member for drawing the members positioned on one side of said wheel together responsive to the movement of each lever from a first position to a second position; and means on each of said last-mentioned members for securing thereto the lever shiftably carried by the adjacent member when said lever is in said second position, whereby said chains are drawn against and maintained in fixed locations on said periphery to thereby augment the traction of the wheel on said surface.

4. A chain assembly for a wheel having a tire thereon and movable over a surface, said assembly comprising a pair of traction-producing units, each including a pair of elongated members and a pair of chains interconnecting corresponding ends of said members, said units adapted to be positioned on said wheel on opposed sides of the axis of revolution thereof with the members of each unit being disposed on opposed sides of said wheel and the chains being disposed across and engageable with the periphery of the tire; a lever having a notch therein and shiftably carried by each of the members disposed on one side of the wheel and engageable with the adjacent member for drawing the members disposed on said one side of the wheel together responsive to the movement of the lever from a first position to a second position; a chain secured to one end of each of the last-mentioned members, said chain having a link receivable within said notch for securing the chain to the lever of the adjacent member as the lever moves toward said second position; and means on said last-mentioned members for securing the levers thereto when said levers are in said second positions, whereby said chains may be drawn against and maintained in fixed locations on said periphery to thereby augment the traction of the wheel on said surface.

5. A chain assembly for a wheel having a tire thereon and movable over a surface, said assembly comprising a pair of traction-producing units, each including a pair of elongated members and a pair of chains interconnecting corresponding ends of said members, said units adapted to be positioned on said wheel on opposed sides of the axis of revolution thereof with the members of each unit being disposed on opposed sides of said wheel and the chains being disposed across and engageable with the periphery of the tire; a lever shiftably carried by each of the members disposed on one side of the wheel, each of said levers being secured to the corresponding member at the opposite end thereof and engageable with the adjacent member for drawing the members disposed on said one side of the wheel together responsive to the movement of the lever from a first position to a second position; an elongated element secured to one end of each of the last-mentioned members, said element being operably coupled with the lever of the adjacent member and movable toward the latter as said lever is shifted toward said second position; and means on said last-mentioned members for securing the levers thereto when said levers are in said second positions, whereby said chains may be drawn against and maintained in fixed locations on said periphery to thereby augment the traction of the wheel on said surface.

6. A chain assembly as set forth in claim 5 and including a chain interconnecting each of said levers and the member corresponding thereto, said last-mentioned chain being secured to the lever intermediate the ends of the latter.

7. A chain assembly as set forth in claim 6, said lever having a notch therein at one end thereof, said element of the adjacent member comprising a chain having a link receivable within the notch for interconnecting said lever with said element.

8. Traction apparatus for a wheel having a tire thereon and movable over a surface, the combination with said wheel of a pair of traction-producing units, each including a pair of elongated members and a pair of chains interconnecting corresponding ends of said members, said units being positioned on said wheel on opposed sides of the axis of revolution thereof with the members of each unit being positioned on opposed sides of the wheel and the chains being positioned across and engageable with the periphery of the tire; a lever shiftably carried by each member positioned on one side of said wheel and engageable with the adjacent member for drawing the members positioned on one side of said wheel together responsive to the movement of the lever from a first position to a second position; and means for securing the lever to the adjacent member when said lever is in said second position including a ring carried by said adjacent member and movable into a position looped about said lever at the proximal end thereof, whereby said chains are drawn against and maintained in fixed locations on said periphery to thereby augment the traction of the wheel on said surface.

References Cited in the file of this patent

UNITED STATES PATENTS

| | | |
|---|---|---|
| 1,439,096 | Golphin | Dec. 19, 1922 |
| 2,694,431 | Howard | Nov. 16, 1954 |
| 2,918,960 | McGuinness | Dec. 29, 1959 |